(12) United States Patent
Kichline, Jr. et al.

(10) Patent No.: US 6,255,631 B1
(45) Date of Patent: Jul. 3, 2001

(54) APPARATUS AND METHOD FOR JOINING VEHICLE FRAME COMPONENTS

(75) Inventors: John L. Kichline, Jr., Reading; Richard L. Stuck, Stevens, both of PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/450,458

(22) Filed: Nov. 29, 1999

(51) Int. Cl.$^7$ .......................... B23K 13/01; B21D 39/04
(52) U.S. Cl. ..................... 219/617; 228/127; 228/234.1
(58) Field of Search ..................... 228/126, 127, 228/128, 234.1; 219/643, 644, 603, 607, 617

(56) References Cited

U.S. PATENT DOCUMENTS

| | | |
|---|---|---|
| 3,552,765 | 1/1971 | Ostwald . |
| 3,603,760 * | 9/1971 | Konstantin et al. . |
| 4,246,464 * | 1/1981 | Alstetter et al. . |
| 4,745,245 * | 5/1988 | Kitaide et al. . |
| 5,000,368 * | 3/1991 | Turner . |
| 5,453,149 * | 9/1995 | Szczesniak . |
| 5,458,393 | 10/1995 | Benedyk . |
| 5,603,581 | 2/1997 | Fujita et al. . |
| 5,810,958 * | 9/1998 | Ragno et al. . |
| 5,833,542 * | 11/1998 | Harrold et al. . |
| 5,848,469 | 12/1998 | O'Connor et al. . |
| 5,865,362 | 2/1999 | Behrmann et al. . |
| 5,966,813 * | 10/1999 | Durand . |
| 5,968,304 * | 10/1999 | Ragno et al. . |
| 5,981,921 * | 11/1999 | Yablochnikov . |
| 6,104,012 * | 8/2000 | Durand . |

FOREIGN PATENT DOCUMENTS

| | | |
|---|---|---|
| 004123487A1 * | 1/1993 | (DE) . |
| 360104703A * | 6/1985 | (JP) . |
| 401118311A * | 5/1989 | (JP) . |
| WO97/00151 * | 1/1997 | (WO) . |
| WO97/00595 * | 1/1997 | (WO) . |

\* cited by examiner

*Primary Examiner*—Tom Dunn
*Assistant Examiner*—Kiley Stoner
(74) *Attorney, Agent, or Firm*—MacMillan, Sobanski & Todd, LLC

(57) ABSTRACT

An apparatus and method for joining two or more vehicle components together to form a joint in a vehicle body and frame assembly is disclosed. The frame assembly can include a pair of longitudinally extending side rails having a plurality of transverse cross members extending therebetween. At least one of the side rails includes a portion that is deformed inwardly to define a mounting projection that is sized to receive an end of one of the cross members therein. The mounting projection is preferably formed having a first relatively large diameter portion that is somewhat larger in diameter than the outer diameter of the end of the cross member and a second relatively small diameter portion that is only slightly larger in diameter than the outer diameter of the end of the cross member. An internal magnetic pulse welding inductor assembly is inserted within the cross member to generate an intense electromagnetic field. The presence of this electromagnetic field causes the end of the cross member to expand outwardly into engagement with the first and second portions of the mounting projection of the side rail at a high velocity. The high velocity impact of the end of the cross member with the mounting projection of the side rail causes some portions of the end of the cross member and the mounting projection of the side rail to weld or molecularly bond together, and causes other portions of the end of the cross member and the mounting projection of the side rail to mechanically interlock or engage one another to form a joint for the vehicle body and frame assembly.

34 Claims, 8 Drawing Sheets

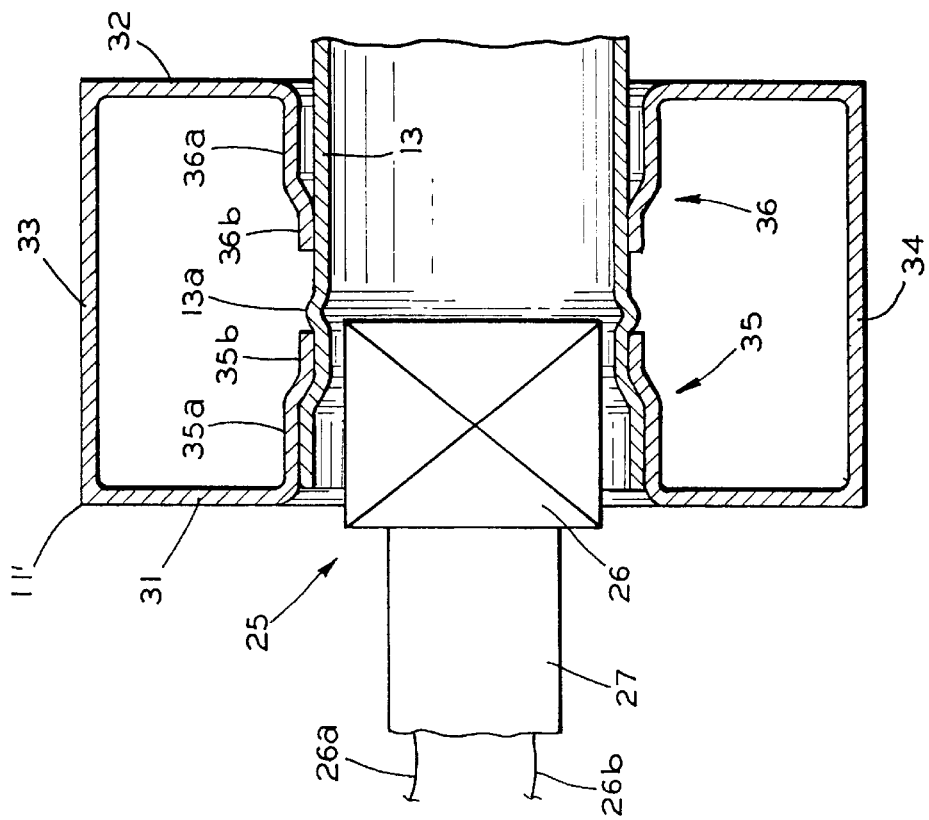
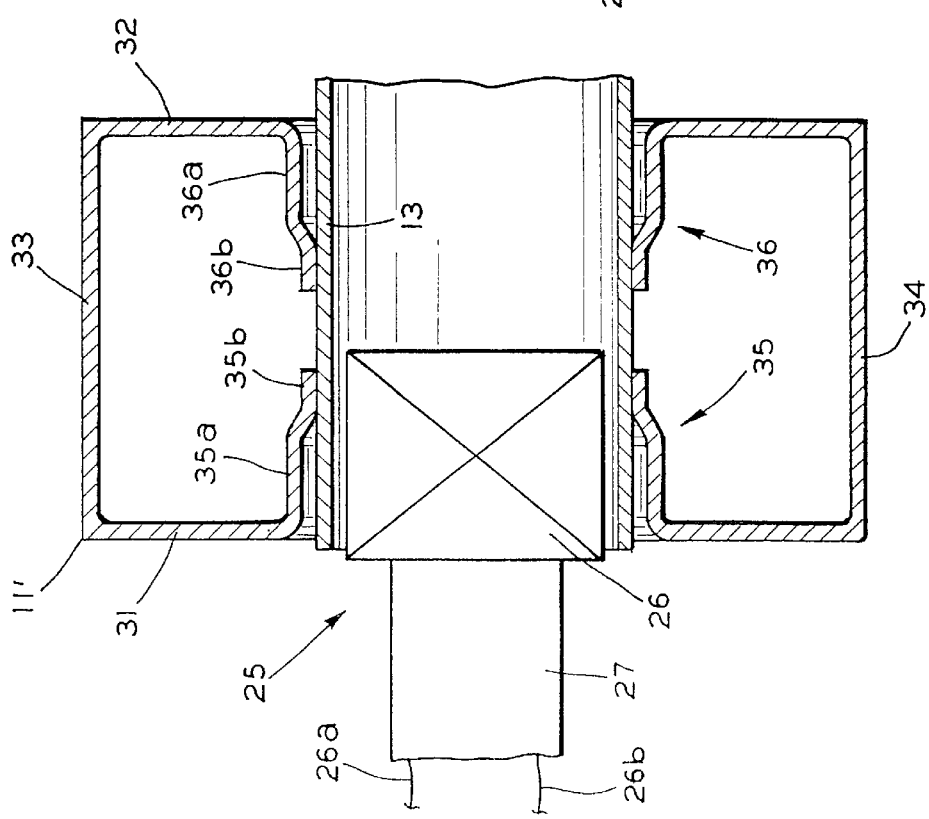

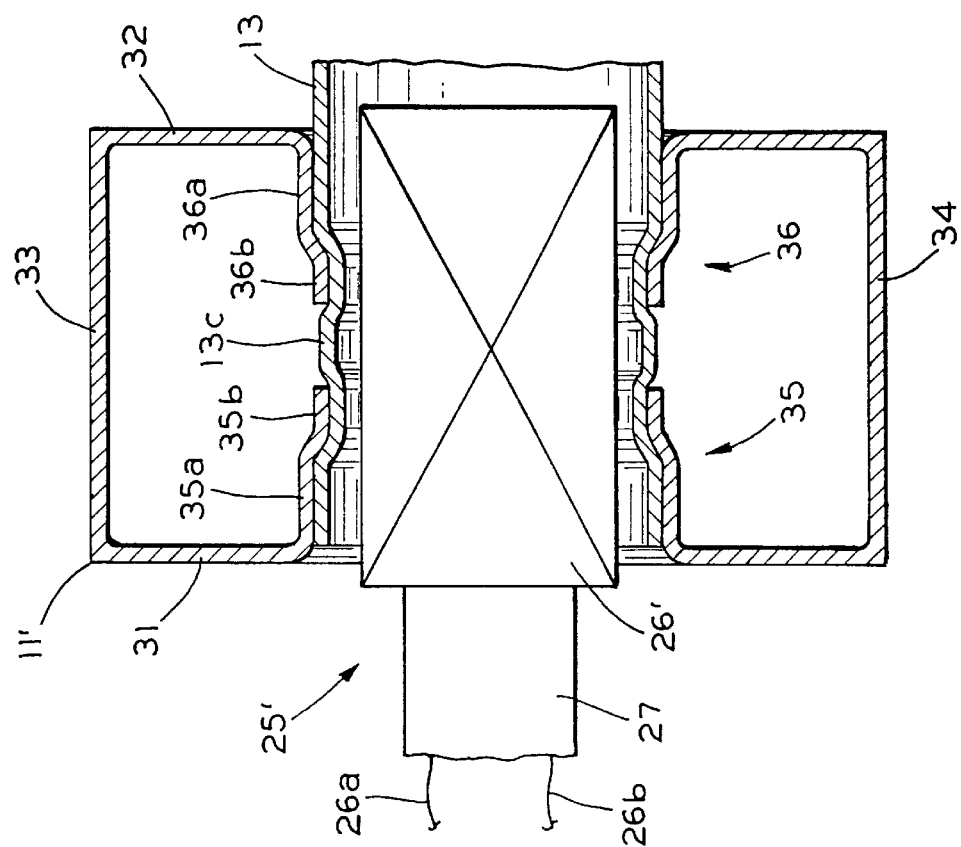
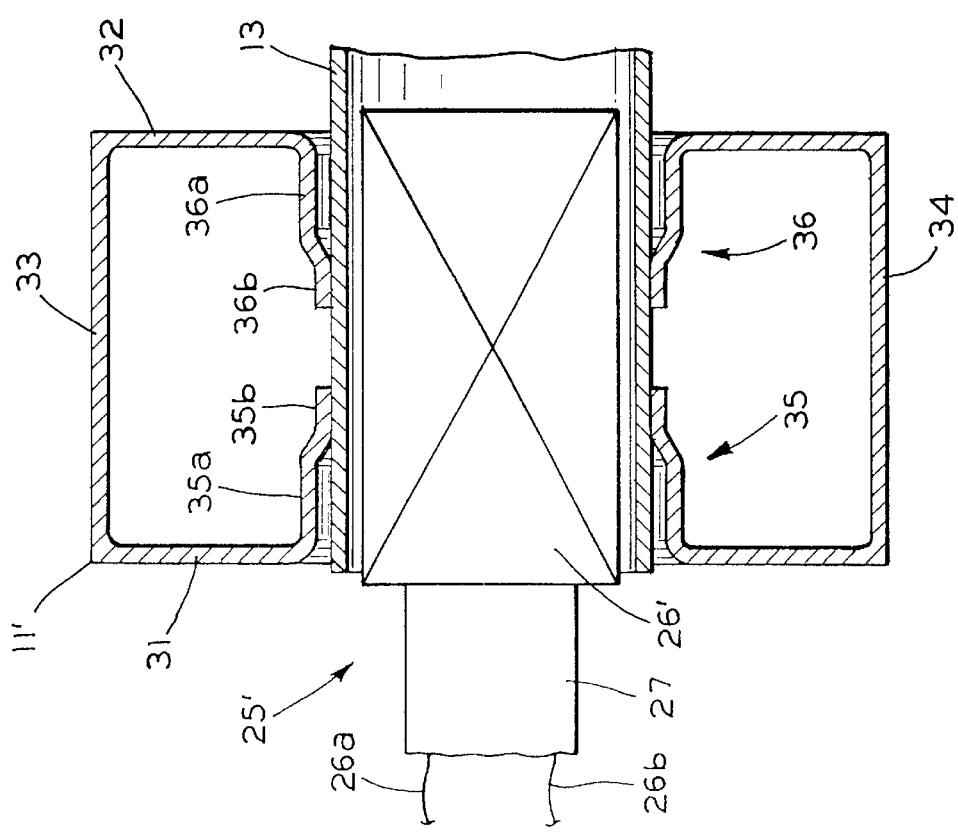

APPARATUS AND METHOD FOR JOINING VEHICLE FRAME COMPONENTS

BACKGROUND OF THE INVENTION

This invention relates in general to vehicular body and frame assemblies. In particular, this invention relates to an apparatus and method for forming joints between various components, such as between side rails and cross members, in such a vehicle body and frame assembly.

Many land vehicles in common use, such as automobiles, vans, and trucks, include a body and frame assembly that is supported upon a plurality of groundengaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Each of these body and frame assemblies is composed of a plurality of individual vehicle frame components that are secured together. In the past, virtually all of these vehicle frame components have been manufactured from a metallic material. Steel has traditionally been the preferred material for manufacturing all of such vehicle frame components because of its relatively high strength, relatively low cost, and ease of manufacture. Vehicle frame components manufactured from traditional metallic materials have been secured together by conventional welding techniques. As is well known, conventional welding techniques involve the application of heat to localized areas of two metallic members, which results in a coalescence of the two metallic members. Such welding may or may not be performed with the application of pressure, and may or may not include the use of a filler metal. Although conventional welding techniques have functioned satisfactorily in the past, there are some drawbacks to the use thereof in joining metallic vehicle frame components together. First, as noted above, conventional welding techniques involve the application of heat to localized areas of the two metallic frame members. This application of heat can cause undesirable distortions and weaknesses to be introduced into the metallic components. Second, while conventional welding techniques are well suited for joining components that are formed from similar metallic materials, it has been found to be somewhat more difficult to adapt them for use in joining components formed from dissimilar metallic materials. Third, conventional welding techniques are not easily adapted for joining components that have different gauge thicknesses. Inasmuch as the production of vehicle frames is usually an high volume, low margin process, it would be desirable to provide an improved apparatus and method for permanently joining two or more metallic vehicle frame components that avoids the drawbacks of conventional welding techniques.

SUMMARY OF THE INVENTION

This invention relates to an improved apparatus and method for joining two or more vehicle components together to form a joint in a vehicle body and frame assembly. The frame assembly can include a pair of longitudinally extending side rails having a plurality of transverse cross members extending therebetween. At least one of the side rails includes a portion that is deformed inwardly to define a mounting projection that is sized to receive an end of one of the cross members therein. The mounting projection is preferably formed having a first relatively large diameter portion that is somewhat larger in diameter than the outer diameter of the end of the cross member and a second relatively small diameter portion that is only slightly larger in diameter than the outer diameter of the end of the cross member. An internal magnetic pulse welding inductor assembly is inserted within the cross member to generate an intense electromagnetic field. The presence of this electromagnetic field causes the end of the cross member to expand outwardly into engagement with the first and second portions of the mounting projection of the side rail at a high velocity. The high velocity impact of the end of the cross member with the mounting projection of the side rail causes some portions of the end of the cross member and the mounting projection of the side rail to weld or molecularly bond together, and causes other portions of the end of the cross member and the mounting projection of the side rail to mechanically interlock or engage one another to form a joint for the vehicle body and frame assembly.

Various objects and advantages of this invention will become apparent to those skilled in the art from the following detailed description of the preferred embodiments, when read in light of the accompanying drawings.

BRIEF DESCRIPTION OF THE DRAWINGS

FIG. 4 is a sectional elevational view of a second embodiment of a joint between one of the side rails and one of the cross members illustrated in FIG. 1 prior to being joined together by an internal magnetic pulse welding inductor in accordance with this invention.

FIG. 5 is a sectional elevational view of the second embodiment of the joint illustrated in FIG. 4 showing the side rail and the cross member after being partially joined together by the internal magnetic pulse welding inductor.

FIG. 7 is a sectional elevational view of the second embodiment of the joint illustrated in FIG. 4 prior to being joined together by a modified internal magnetic pulse welding inductor in accordance with this invention.

FIG. 8 is a sectional elevational view of the second embodiment of the joint illustrated in FIG. 7 showing the side rail and the cross member after being joined together by the modified internal magnetic pulse welding inductor.

DETAILED DESCRIPTION OF THE PREFERRED EMBODIMENTS

Figure 1:
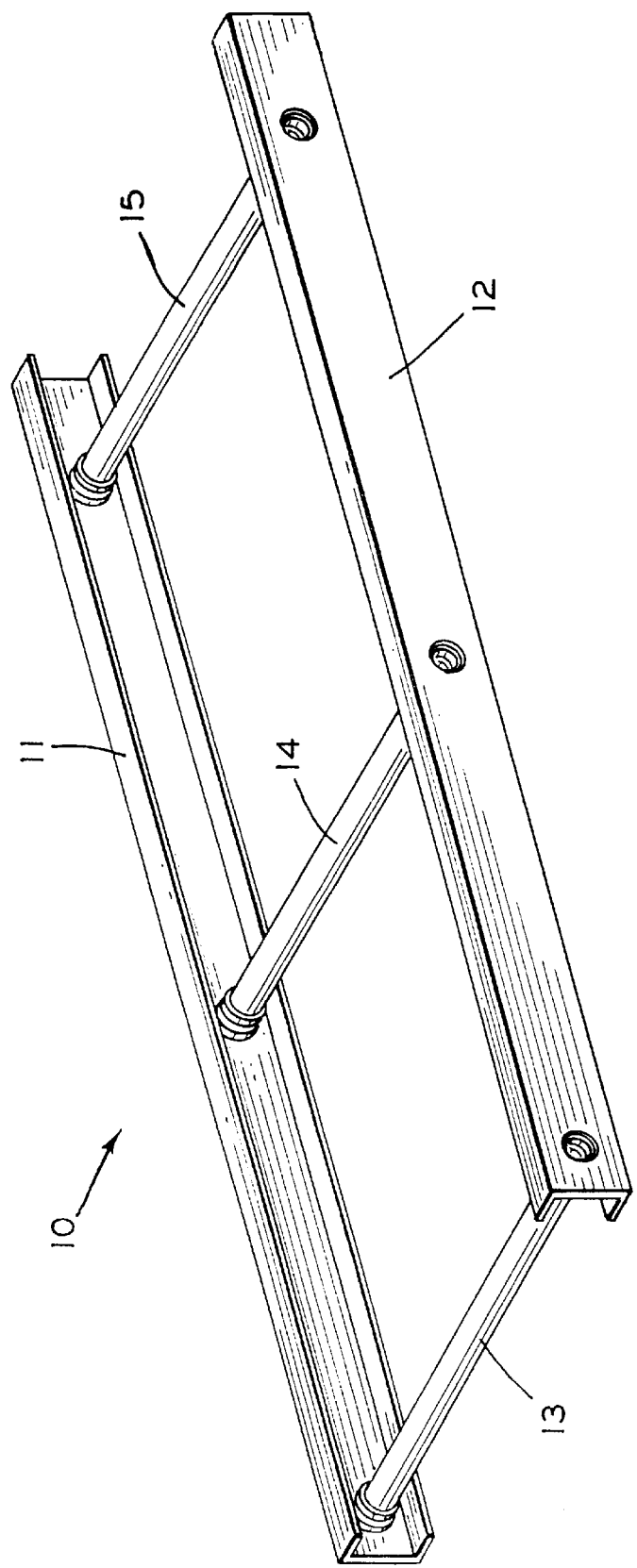
FIG. 1 is a schematic perspective view of a vehicle body and frame assembly manufactured in accordance with the apparatus and method of this invention.

Referring now to the drawings, there is schematically illustrated in FIG. 1 a vehicle body and frame assembly, indicated generally at 10, that has been manufactured in accordance with the apparatus and method of this invention. The illustrated vehicle body and frame assembly 10 is a ladder frame assembly. However, it will be appreciated that the apparatus and method of this invention may be utilized in the manufacture of any type of vehicle body and frame assembly, such as a unitized body and frame assembly where the structural components of the body portion and the frame portion are combined into an integral unit.

The illustrated ladder frame assembly 10 includes a pair of longitudinally extending side rails 11 and 12 having a plurality of transverse cross members 13, 14, and 15 extending therebetween. The side rails 11 and 12 extend longitudinally along the length of the assembly 10 and are generally parallel to one another. Each of the illustrated side rails 11 and 12 is formed from a single, unitary member that extends along the entire length of the assembly 10. However, it will be appreciated that the side rails 11 and 12 may extend for only a portion of the length of the frame assembly 10. Alternatively, either or both of the side rails 11 and 12 may be formed from two or more individual side rail sections that are welded or secured together in any manner to form the side rails 11 and 12. The illustrated side rails 11 and 12 are formed from open channel structural members having a cross sectional shape that is generally C-shaped. However, the side rails 11 and 12 may be formed having any desired cross sectional shape. Furthermore, as will become apparent below, the side rails 11 and 12 may be formed from closed channel structural members having any desired cross sectional shape. The side rails 11 and 12 may be formed from any desired material or group of materials.

The cross members 13, 14, and 15 extend generally perpendicular to the side rails 11 and 12. The cross members 13, 14, and 15 are spaced apart from one another along the length of the assembly 10. The ends of the cross members 13, 14, and 15 are secured to the side rails 11 and 12 at respective joints, the structures of which will be described and illustrated in detail below. When secured to the side rails 11 and 12, the cross members 13, 14, and 15 provide desired rigidity to the assembly 10. Although three cross members 13, 14, and 15 are shown in FIG. 1, it will be appreciated that a greater or lesser number of such cross members may be provided. The illustrated cross members 13, 14, and 15 are formed from closed channel structural members having a generally circular cross sectional shape. However, the cross members 13, 14, and 15 may be formed having any desired cross sectional shape and may, if desired, be from open channel structural members. The cross members 13, 14, and 15 may also be formed from any desired material or group of materials.

Figure 2:
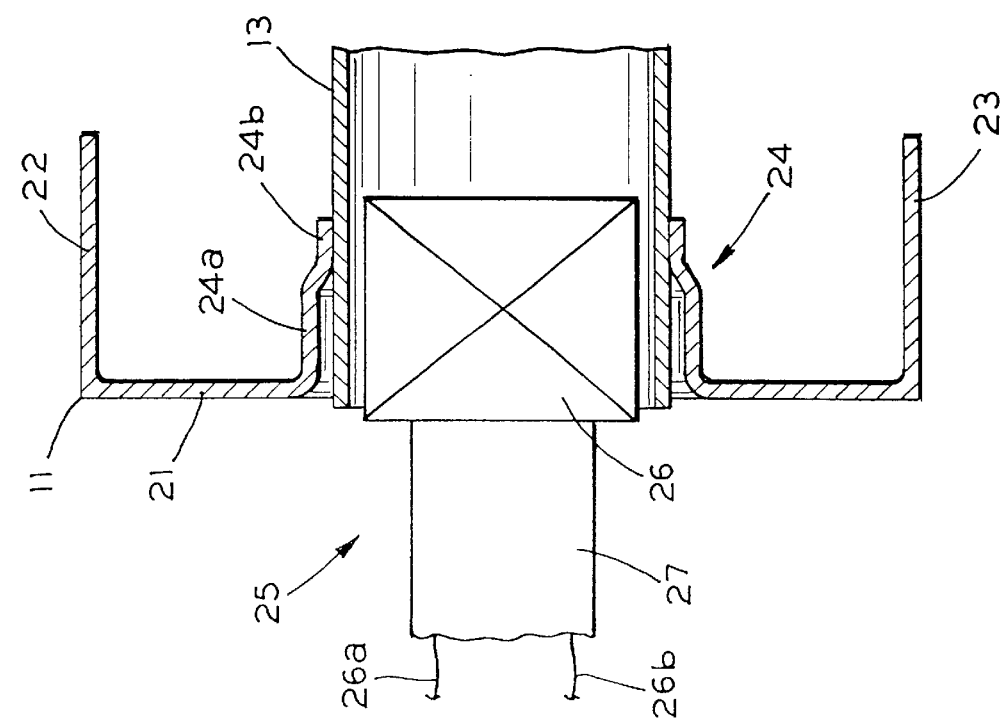
FIG. 2 is a sectional elevational view of a first embodiment of a joint between one of the side rails and one of the cross members illustrated in FIG. 1 prior to being joined together by an internal magnetic pulse welding inductor in accordance with this invention.

Referring now to FIG. 2, there is illustrated a first embodiment of a joint between one of the side rails 11 and one of the cross members 13 illustrated in FIG. 1 prior to being joined together. As shown therein, the side rail 11 includes a central web 21 having upper and lower flanges 22 and 23 extending therefrom. A portion of the web 21 is deformed inwardly to provide an opening defining a cross member mounting projection, indicated generally at 24. As will be explained in greater detail below, the mounting projection 24 is sized to receive an end of the cross member 13 therein to form a joint between the side rail 11 and the cross member 13. In the illustrated embodiment, the mounting projection 24 is generally cylindrical in shape, corresponding to the generally cylindrical shape of the end of the cross member 13. However, it will be appreciated that the mounting projection 24 and the end of the cross member 13 may have any desired shapes.

The mounting projection 24 is preferably formed having a first relatively large diameter portion 24a and a second relatively small diameter portion 24b. The relatively large diameter portion 24a of the mounting projection 24 is somewhat larger in diameter than the outer diameter of the end of the cross member 13, thus providing a relatively large annular gap therebetween, as shown in FIG. 2. The relatively small diameter portion 24b of the mounting projection 24 is only slightly larger in diameter than the outer diameter of the end of the cross member 13, thus providing a relatively small annular gap therebetween, as shown in FIG. 2.

An internal magnetic pulse welding inductor assembly, indicated generally at 25, is provided to connect the end of the cross member 13 to the mounting projection 24 of the side rail 11. The magnetic pulse welding inductor assembly 25 is generally conventional in the art and includes an electromagnetic coil 26 that is carried at the end of a movable support 27. The coil 26 is composed of a winding of an electrical conductor having leads 26a and 26b that extend therefrom through a switch (not shown) to a source of electrical power (not shown). In a manner that is known in the art, when the switch is closed, a closed electrical circuit is formed through the leads 26a and 26b between the source of electrical power and the coil 26. As a result, electrical current flows through the coil 26, causing an intense electromagnetic field to be generated thereabout.

Figure 3:
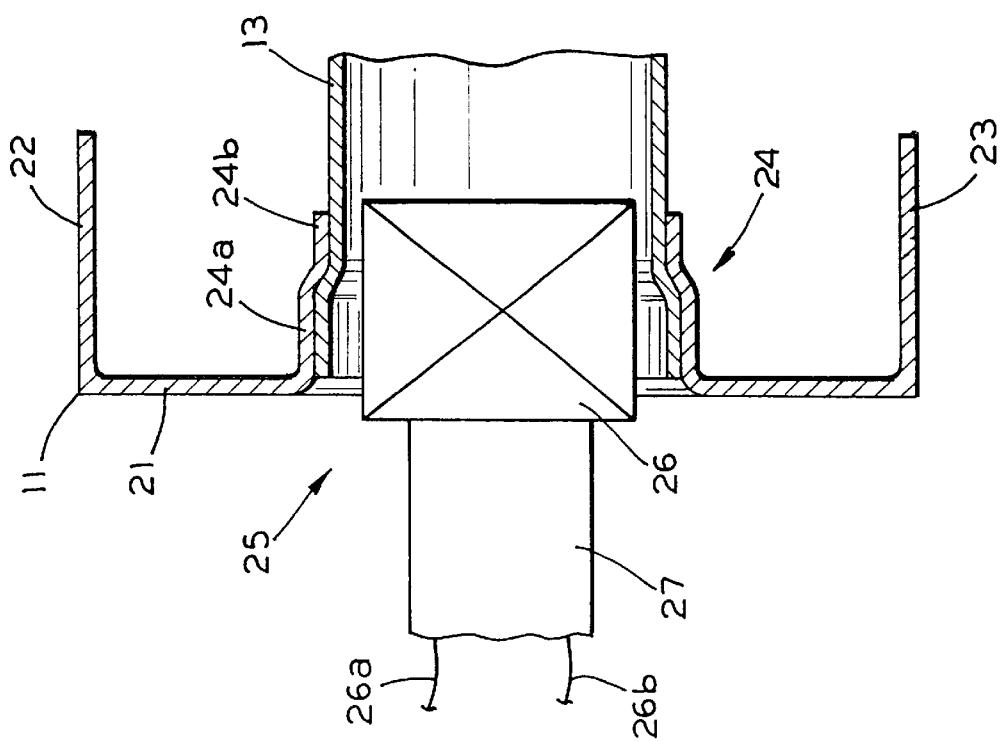
FIG. 3 is a sectional elevational view of the first embodiment of the joint illustrated in FIG. 2 showing the side rail and the cross member after being joined together by the internal magnetic pulse welding inductor.

The presence of this electromagnetic field causes the end of the cross member 13 to expand outwardly at a high velocity into engagement with the mounting projection 24 of the side rail 11. Such high velocity engagement causes some portions of the end of the cross member 13 and the mounting projection 24 to weld or molecularly bond together, while other portions of the end of the cross member 13 and the mounting projection 24 mechanically interlock or engage one another, as shown in FIG. 3. Specifically, because of the relatively large size of the annular gap between the first portion of the end of the cross member 13 and the relatively large diameter portion 24a of the mounting projection 24, the generation of the electromagnetic field causes the first portion of the end of the cross member 13 to be accelerated throughout a relatively large distance to achieve a relatively high velocity. Because it is able to achieve this relatively high velocity, the outer surface of the first portion of the end of the cross member 13 will weld or molecularly bond with the inner surface of the relatively large diameter portion 24a of the mounting projection 24. However, because of the relatively small annular gap between the second portion of the end of 20 the cross member 13 and the relatively small diameter portion 24b of the mounting projection 24, the generation of the electromagnetic field causes the second portion of the end of the cross member 13 to be accelerated throughout a relatively small distance to achieve a relatively low velocity. Because it is unable to achieve a relatively high velocity, the outer surface of the second portion of the end of the cross member 13 will mechanically engage and interlock with the inner surface of the relatively small diameter portion 24b of the mounting projection 24, but will not weld or molecularly bond therewith. Thus, first portions of the end of the cross member 13 and the mounting projection 24 are welded or molecularly bonded together, while second portions of the end of the cross member 13 and the mounting projection 24 mechanically interlock or engage one another.

As mentioned above, the illustrated mounting projection 24 is generally cylindrical in shape, corresponding generally to the cylindrical shape of the end of the cross member 13. However, the mounting projection 24 and the end of the cross member 13 may have any desired shapes. For example, it may be desirable in some instances to form the mounting projection 24 and the end of the cross member 13 having non-circular cross sectional shapes. Such non-circular cross sectional shapes would provide an additional measure of strength to the joint so as to resist twisting movement of the cross member 13 relative to the side rail 11 under the influence of torsional stresses that may be encountered during use.

Referring now to FIG. 4, there is illustrated a second embodiment of a joint between a modified structure for one of the side rails 11' and one of the cross members 13 illustrated in FIG. 1 prior to being joined together. As shown therein, the modified side rail 11' is a closed channel structural member including first and second webs 31 and 32 having upper and lower flanges 33 and 34 extending therebetween. A portion of the first web 31 is deformed inwardly to provide an opening defining a first cross member mounting projection, indicated generally at 35, that is sized to receive a first portion of the end of the cross member 13 therein. Similarly, a portion of the second web 32 is deformed inwardly to provide an opening defining a second cross member mounting projection, indicated generally at 36, that is sized to receive a second portion of the end of the cross member 13 therein. In the illustrated embodiment, the mounting projections 35 and 36 are generally cylindrical in shape, corresponding generally to the cylindrical shape of the end of the cross member 13. However, it will be appreciated that the first and second mounting projections 35 and 36 and the end of the cross member 13 may have any desired shapes.

The first mounting projection 35 is preferably formed having a first relatively large diameter portion 35a and a second relatively small diameter portion 35b. Similarly, the second mounting projection 36 is preferably formed having a first relatively large diameter portion 36a and a second relatively small diameter portion 36b. The relatively large diameter portions 35a and 35b of the mounting projections 35 and 36 are somewhat larger in diameter than the outer diameter of the corresponding portions of the end of the cross member 13, thus providing relatively large annular gaps therebetween, as shown in FIG. 4. The relatively small diameter portions 35b and 36b of the mounting projections 35 and 36 are only slightly larger in diameter than the outer diameter of the end of the cross member 13, thus providing relatively small annular gaps therebetween, as shown in FIG. 4.

To form the joint, the magnetic pulse welding inductor assembly 25 is initially inserted within the end of the cross member 13 such that it is located within the first mounting portion 35 of the side rail 11'. Then, the coil 26 is connected to the source of electrical power so as to generate the intense electromagnetic field. In the same manner as described above, the generation of the electromagnetic field by the coil 26 causes a first portion of the end of the cross member 13 and the first mounting projection 35 to weld or molecularly bond together, while a second portion of the end of the cross member 13 and the first mounting projection 35 mechanically interlock or engage one another, as shown in FIG. 5.

Specifically, because of the relatively large annular gap between the first portion of the end of the cross member 13 and the relatively large diameter portion 35a of the first mounting projection 35, the generation of the electromagnetic field causes the first portion of the end of the cross member 13 to be accelerated throughout a relatively large distance to achieve a relatively high velocity. Because it is able to achieve this relatively high velocity, the outer surface of the first portion of the end of the cross member 13 will weld or molecularly bond with the inner surface of the relatively large diameter portion 35a of the first mounting projection 35. However, because of the relatively small annular gap between the second portion of the end of the cross member 13 and the relatively small diameter portion 35b of the first mounting projection 35, the generation of the electromagnetic field causes the second portion of the end of the cross member 13 to be accelerated throughout a relatively small distance to achieve a relatively low velocity. Because it is unable to achieve a relatively high velocity, the outer surface of the second portion of the end of the cross member 13 will mechanically engage and interlock with the inner surface of the relatively small diameter portion 35b of the first mounting projection 35, but will not weld or molecularly bond therewith. Thus, the first portion of the end of the cross member 13 and the first mounting projection 35 are welded or molecularly bonded together, while the second portion of the end of the cross member 13 and the first mounting projection 35 mechanically interlock or engage one another.

If desired, the expansion of the cross member 13 additionally (or alternatively) result in the creation of a bulged portion 13a. The bulged portion 13a is formed immediately adjacent to and abuts the inner end of the relatively small diameter portion 35b of the first mounting projection 35. Thus, the bulged portion 13a of the cross member 13 abuts and mechanically interlocks or engages the side rail 11 to prevent axial removal therefrom.

Figure 6:
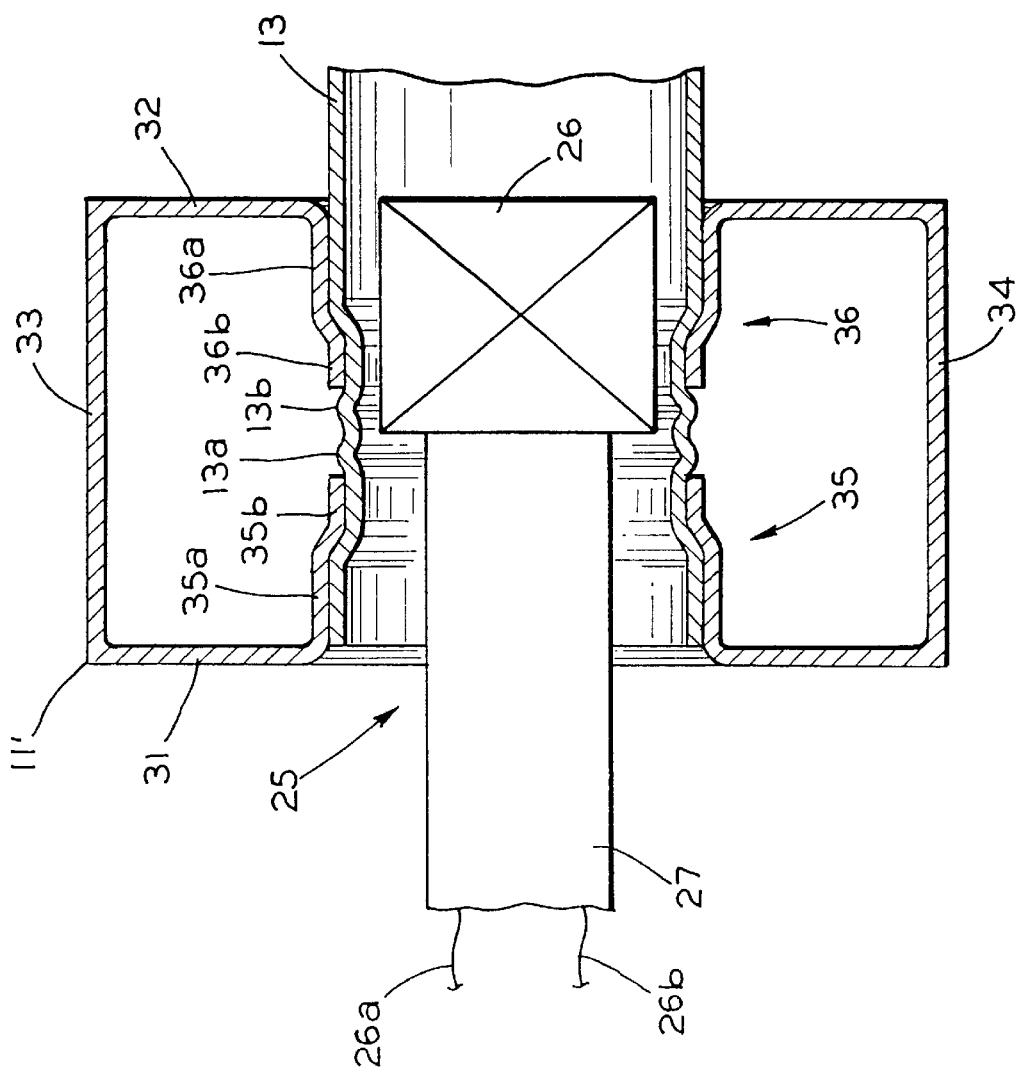
FIG. 6 is a sectional elevational view of the second embodiment of the joint illustrated in FIG. 5 showing the side rail and the cross member after being completely joined together by the internal magnetic pulse welding inductor.

Next, the magnetic pulse welding inductor assembly 25 is moved further within the end of the cross member 13 such that it is located within the second mounting portion 36 of the side rail 11'. Then, the coil 26 is connected to the source of electrical power so as to generate the intense electromagnetic field. In the same manner as described above, the generation of the electromagnetic field by the coil 26 causes a third portion of the cross member 13 and the second mounting projection 36 to weld or molecularly bond together, while a fourth portion of the cross member 13 and the second mounting projection 36 mechanically interlock or engage one another, as shown in FIG. 6. Specifically, because of the relatively large annular gap between the first portion of the end of the cross member 13 and the relatively large diameter portion 36*a* of the second mounting projection 36, the generation of the electromagnetic field causes the third portion of the end of the cross member 13 to be accelerated throughout a relatively large distance to achieve a relatively high velocity. Because it is able to achieve this relatively high velocity, the outer surface of the third portion of the end of the cross member 13 will weld or molecularly bond with the inner surface of the relatively large diameter portion 36*a* of the second mounting projection 36. However, because of the relatively small annular gap between the second portion of the end of the cross member 13 and the relatively small diameter portion 36*b* of the second mounting projection 36, the generation of the electromagnetic field causes the fourth portion of the end of the cross member 13 to be accelerated throughout a relatively small distance to achieve a relatively low velocity. Because it is unable to achieve a relatively high velocity, the outer surface of the fourth portion of the end of the cross member 13 will mechanically engage and interlock with the inner surface of the relatively small diameter portion 36*b* of the second mounting projection 36, but will not weld or molecularly bond therewith. Thus, the third portion of the cross member 13 and the second mounting projection 36 are welded or molecularly bonded together, while the fourth portion of the cross member 13 and the second mounting projection 36 mechanically interlock or engage one another.

Similarly, the expansion of the cross member 13 can additionally (or alternatively) result in the creation of a second bulged portion 13*b*. The second bulged portion 13*b* is formed immediately adjacent to and abuts the inner end of the relatively small diameter portion 36*b* of the second mounting projection 36. Thus, the bulged portion 13*a* of the cross member 13 abuts and mechanically interlocks or engages the side rail 11 to prevent axial removal therefrom.

FIG. 7 is a sectional elevational view of the second embodiment of the joint illustrated in FIGS. 4, 5, and 6 prior to being joined together by a modified internal magnetic pulse welding inductor, indicated generally at 25', in accordance with this invention. The modified magnetic pulse welding inductor assembly 25' is identical to the magnetic pulse welding inductor assembly 25 described above, except it includes an enlarged coil 26' that is sufficiently large as to simultaneously cause the end of the cross member 13 to be connected to both the first and second mounting portions 35 and 36 of the side rail 11' in the manner described above. The expansion of the cross member 13 additionally (or alternatively) result in the creation of a single bulged portion 13*c*. The bulged portion 13*c* is formed between and abuts the inner ends of the relatively small diameter portions 35*b* and 36*b* of the first and second mounting projections 35 and 36, respectively. Thus, the bulged portion 13*c* of the cross member 13 abuts and mechanically interlocks or engages the side rail 11' to prevent axial removal therefrom.

Figure 9:
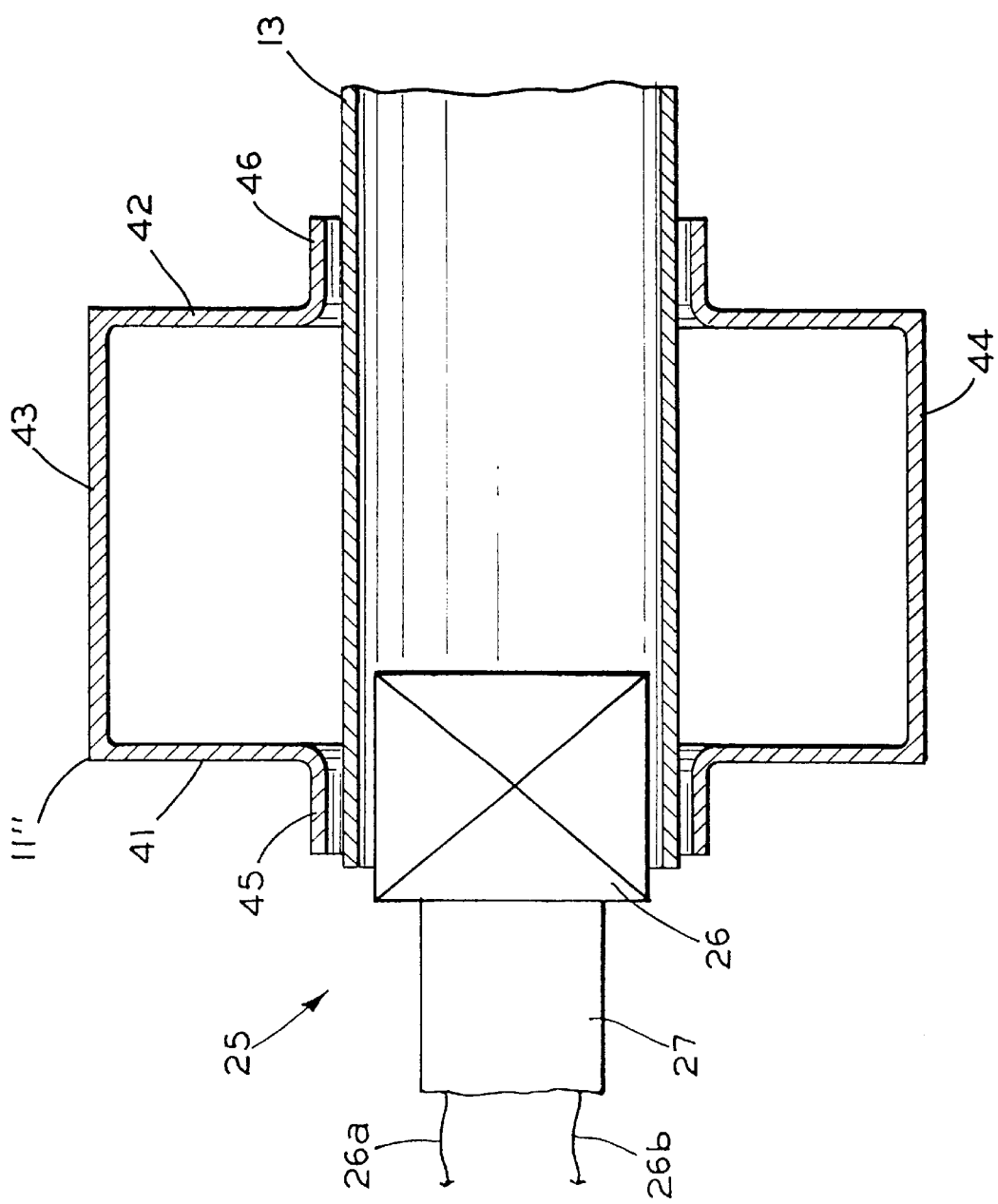
FIG. 9 is a sectional elevational view of a third embodiment of a joint between one of the side rails and one of the cross members illustrated in FIG. 1 prior to being joined together by an internal magnetic pulse welding inductor in accordance with this invention.

Referring now to FIG. 9, there is illustrated a third embodiment of a joint between a further modified structure for one of the side rails 11'' and one of the cross members 13 illustrated in FIG. 1 prior to being joined together. As shown therein, the modified side rail 11' is a closed channel structural member including first and second webs 41 and 42 having upper and lower flanges 43 and 44 extending therebetween. A portion of the first web 41 is deformed outwardly to provide an opening defining a first cross member mounting projection 45 that is sized to receive a first portion of the end of the cross member 13 therein. Similarly, a portion of the second web 32 is deformed outwardly to provide an opening defining a second cross member mounting projection 46 that is sized to receive a second portion of the end of the cross member 13 therein. In the illustrated embodiment, the mounting projections 45 and 46 are generally cylindrical in shape, corresponding generally to the cylindrical shape of the end of the cross member 13. However, it will be appreciated that the first and second mounting projections 45 and 46 and the end of the cross member 13 may have any desired shapes. The first and second mounting projections 45 and 46 are preferably somewhat larger in diameter than the outer diameter of the corresponding portions of the end of the cross member 13, thus providing relatively large annular gaps therebetween, as shown in FIG. 9.

Figure 10:
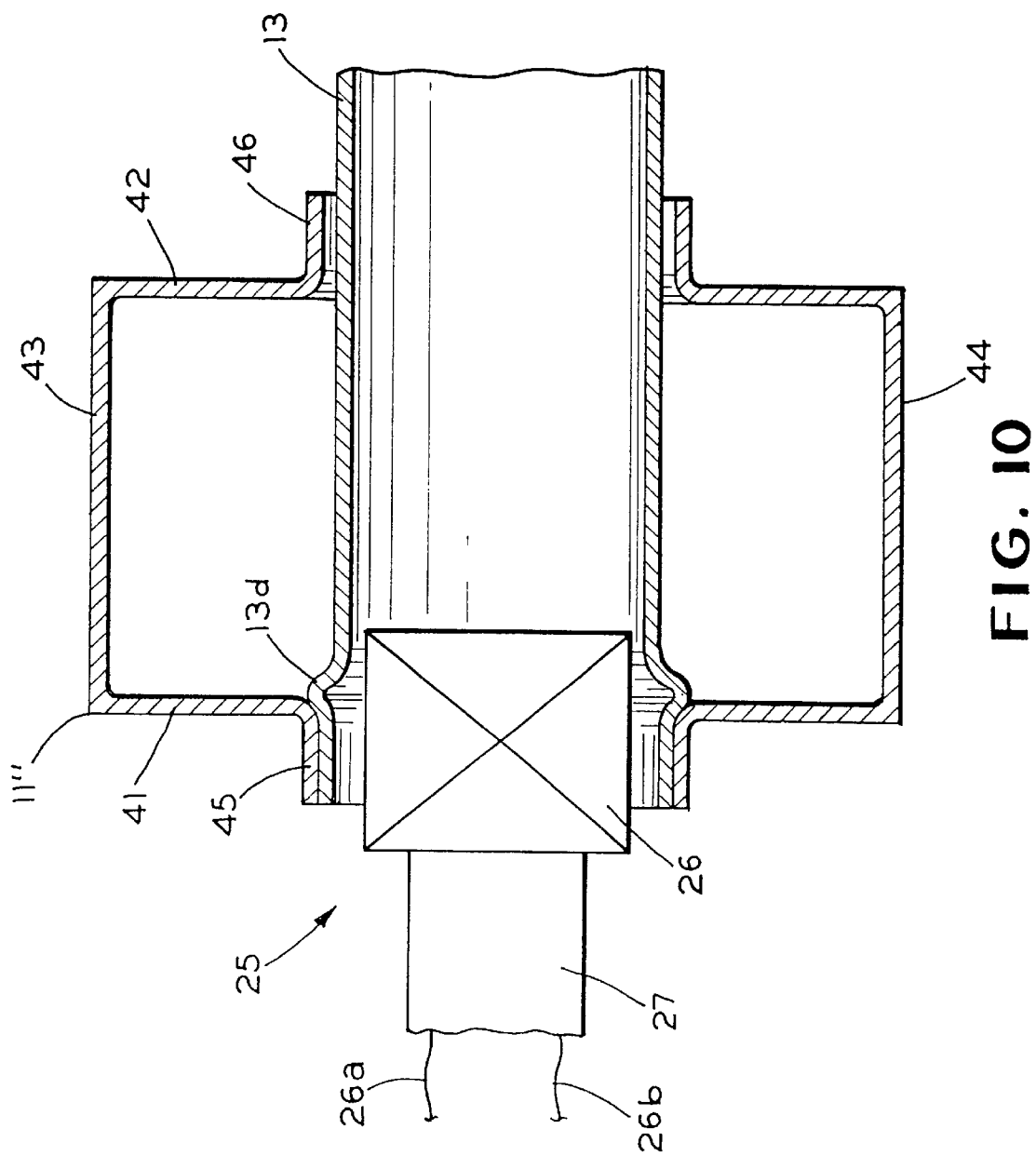
FIG. 10 is a sectional elevational view of the third embodiment of the joint illustrated in FIG. 9 showing the side rail and the cross member after being partially joined together by the internal magnetic pulse welding inductor.

To form the joint, the magnetic pulse welding inductor assembly 25 is initially inserted within the end of the cross member 13 such that it is located within the first mounting portion 45 of the side rail 11'. Then, the coil 26 is connected to the source of electrical power so as to generate the intense electromagnetic field. In the same manner as described above, the generation of the electromagnetic field by the coil 26 causes a first portion of the cross member 13 and the first mounting projection 45 to weld or molecularly bond together, while a second portion of the cross member 13 mechanically interlock or engage the web 41, as shown in FIG. 10. Specifically, because of the relatively large annular gap between the first portion of the end of the cross member 13 and the relatively large diameter first mounting projection 45, the generation of the electromagnetic field causes the first portion of the end of the cross member 13 to be accelerated throughout a relatively large distance to achieve a relatively high velocity. Because it is able to achieve this relatively high velocity, the outer surface of the first portion of the end of the cross member 13 will weld or molecularly bond with the inner surface of the first mounting projection 45. However, a second portion of the end of the cross member 13 is expanded within the interior of the side rail 11'' to formed a bulged portion 13*d*. Thus, the first portion of the cross member 13 and the first mounting projection 45 are welded or molecularly bonded together, while the bulged portion 13*d* of the cross member 13 abuts and mechanically interlocks or engages the web 41.

Figure 11:
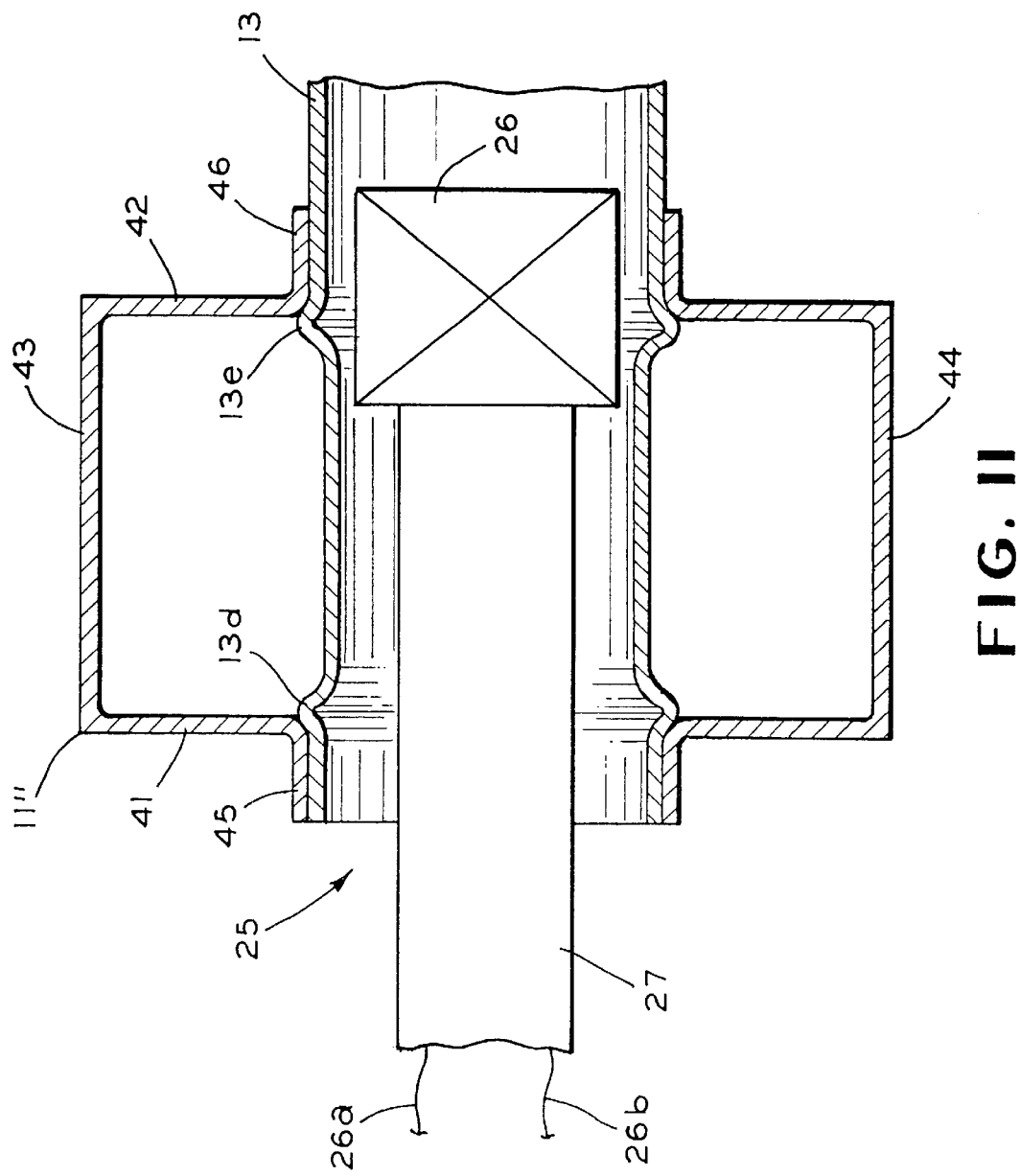
FIG. 11 is a sectional elevational view of the third embodiment of the joint illustrated in FIG. 10 showing the side rail and the cross member after being completely joined together by the internal magnetic pulse welding inductor.

Next, the magnetic pulse welding inductor assembly 25 is moved further within the end of the cross member 13 such that it is located within the second mounting portion 46 of the side rail 11''. Then, the coil 26 is connected to the source of electrical power so as to generate the intense electromagnetic field. In the same manner as described above, the generation of the electromagnetic field by the coil 26 causes a third portion of the cross member 13 and the second mounting projection 46 to weld or molecularly bond together, while a fourth portion of the cross member 13 mechanically interlocks or engages the web 42, as shown in FIG. 11. Specifically, because of the relatively large annular gap between the first portion of the end of the cross member 13 and the relatively large diameter second mounting projection 46, the generation of the electromagnetic field causes the third portion of the end of the cross member 13 to be accelerated throughout a relatively large distance to achieve a relatively high velocity. Because it is able to achieve this relatively high velocity, the outer surface of the third portion of the end of the cross member 13 will weld or molecularly bond with inner surface of the second mounting projection 46. However, a second portion of the end of the cross member 13 is expanded within the interior of the side rail 11'' to formed a second bulged portion 13*e*. Thus, the third portion of the cross member 13 and the first mounting projection 46 are welded or molecularly bonded together, while the second bulged portion 13*e* of the cross member 13 abuts and mechanically interlocks or engages the web 42.

In accordance with the provisions of the patent statutes, the principle and mode of operation of this invention have been explained and illustrated in its preferred embodiment. However ,it must be understood that this invention may be practiced otherwise than as specifically explained and illustrated without departing from its spirit or scope.

What is claimed is:

1. A method of forming a joint between first and second components comprising the steps of:
   (a) providing a first component having an opening;
   (b) providing a second component having an interior;
   (c) disposing the second component within the opening of the first component; and
   (d) generating an electromagnetic field within the interior of the second component, causing the second component to expand outwardly into engagement with the first component at such a velocity as to become welded thereto.

2. The method defined in claim 1 wherein said step (a) is performed by providing a first vehicle frame component, and wherein said step (b) is performed by providing a second vehicle frame component.

3. The method defined in claim 2 wherein said step (a) is performed by providing a side rail for a vehicle frame assembly, and wherein said step (b) is performed by providing a cross member for a vehicle frame assembly.

4. The method defined in claim 1 wherein said step (a) is performed by providing a mounting projection extending from the opening of the first component, and wherein said step (b) is performed by providing the second component within the mounting projection of the first component.

5. The method defined in claim 4 wherein said step (a) is performed by providing a mounting projection that extends inwardly from the opening of the first component.

6. The method defined in claim 4 wherein said step (a) is performed by providing a mounting projection that extends outwardly from the opening of the first component.

7. The method defined in claim 1 wherein said step (c) is performed by causing a first portion of the second component to expand outwardly into engagement with a first portion of the first component at such a velocity as to become welded thereto, and by causing a second portion of the second component to expand outwardly into engagement with a second portion of the first component at such a velocity as to become mechanically interlocked therewith.

8. The method defined in claim 4 wherein said step (a) is further performed by providing the mounting projection with a first portion and a second portion that is smaller than the first portion.

9. The method defined in claim 8 wherein said step (c) is performed by causing a first portion of the second component to expand outwardly into engagement with the first portion of the mounting projection of the first component at such a velocity as to become welded thereto, and by causing a second portion of the second component to expand outwardly into engagement with the second portion of the mounting projection of the first component at such a velocity as to become mechanically interlocked therewith.

10. The method defined in claim 8 wherein said step (c) is performed by causing a portion of the second component to become bulged so as to abut the mounting portion of the first component.

11. The method defined in claim 1 wherein said step (a) is performed by providing a first component having first and second openings, providing the second component within the first and second openings of the first component, and generating the electromagnetic field within the second component, causing it to expand outwardly into engagement with the first component at such a velocity as to become welded thereto.

12. The method defined in claim 11 wherein said step (a) is performed by providing a first mounting projection extending from the first opening of the first component and by providing a second mounting projection extending from the second opening of the first component, and wherein said step (b) is performed by providing the second component within the first and second mounting projections of the first component.

13. The method defined in claim 12 wherein said step (a) is further performed by providing the first mounting projection with a first portion and a second portion that is smaller than the first portion, and by providing the second mounting projection with a first portion and a second portion that is smaller than the first portion.

14. The method defined in claim 13 wherein said step (c) is performed by (c)(1) causing a first portion of the second component to expand outwardly into engagement with the first portion of the first mounting projection of the first component at such a velocity as to become welded thereto, (c)(2) causing a second portion of the second component to expand outwardly into engagement with the second portion of the first mounting projection of the first component at such a velocity as to become mechanically interlocked therewith, (c)(3) causing a third portion of the second component to expand outwardly into engagement with the first portion of the second mounting projection of the first component at such a velocity as to become welded thereto, and (c)(4) causing a fourth portion of the second component to expand outwardly into engagement with the second portion of the second mounting projection of the first component at such a velocity as to become mechanically interlocked therewith.

15. The method defined in claim 14 wherein said step (c) is performed by causing a portion of the second component to become bulged so as to abut the first mounting portion of the first component.

16. The method defined in claim 15 wherein said step (c) is performed by causing a portion of the second component to become bulged so as to abut the second mounting portion of the first component.

17. The method defined in claim 14 wherein said steps (c)(1) and (c)(2) are performed before said steps (c)(3) and (c)(4).

18. The method defined in claim 14 wherein said steps (c)(1) and (c)(2) are performed simultaneously with said steps (c)(3) and (c)(4).

19. A method of forming a joint between first and second components comprising the steps of:
   (a) providing a first component having an opening and a mounting projection extending from the opening;
   (b) providing a second component within the mounting projection of the first component; and
   (c) generating an electromagnetic field within the second component, causing the second component to expand outwardly into engagement with the mounting projection of the first component at such a velocity as to become welded thereto.

20. The method defined in claim 19 wherein said step (a) is performed by providing a first vehicle frame component, and wherein said step (b) is performed by providing a second vehicle frame component.

21. The method defined in claim 20 wherein said step (a) is performed by providing a side rail for a vehicle frame assembly, and wherein said step (b) is performed by providing a cross member for a vehicle frame assembly.

22. The method defined in claim 20 wherein said step (a) is further performed by providing the mounting projection with a first portion and a second portion that is smaller than the first portion.

23. The method defined in claim 22 wherein said step (c) is performed by causing a first portion of the second component to expand outwardly into engagement with the first portion of the mounting projection of the first component at such a velocity as to become welded thereto, and by causing a second portion of the second component to expand outwardly into engagement with the second portion of the mounting projection of the first component at such a velocity as to become mechanically interlocked therewith.

24. The method defined in claim 22 wherein said step (c) is performed by causing a portion of the second component to become bulged so as to abut the mounting portion of the first component.

25. The method defined in claim 19 wherein said step (a) is performed by providing a first component having first and second openings and first and second mounting projections extending respectively from the first and second openings, providing the second component within the first and second mounting projections of the first component, and generating the electromagnetic field within the second component, causing it to expand outwardly into engagement with the first and second mounting projections of the first component at such a velocity as to become welded thereto.

26. The method defined in claim 25 wherein said step (a) is further performed by providing the first mounting projection with a first portion and a second portion that is smaller than the first portion, and by providing the second mounting projection with a first portion and a second portion that is smaller than the first portion.

27. The method defined in claim 26 wherein said step (c) is performed by (c)(1) causing a first portion of the second component to expand outwardly into engagement with the first portion of the first mounting projection of the first component at such a velocity as to become welded thereto, (c)(2) causing a second portion of the second component to expand outwardly into engagement with the second portion of the first mounting projection of the first component at such a velocity as to become mechanically interlocked therewith, (c)(3) causing a third portion of the second component to expand outwardly into engagement with the first portion of the second mounting projection of the first component at such a velocity as to become welded thereto, and (c)(4) causing a fourth portion of the second component to expand outwardly into engagement with the second portion of the second mounting projection of the first component at such a velocity as to become mechanically interlocked therewith.

28. The method defined in claim 27 wherein said step (c) is performed by causing a portion of the second component to become bulged so as to abut the first mounting portion of the first component.

29. The method defined in claim 28 wherein said step (c) is performed by causing a portion of the second component to become bulged so as to abut the second mounting portion of the first component.

30. The method defined in claim 27 wherein said steps (c)(1) and (c)(2) are performed before said steps (c)(3) and (c)(4).

31. The method defined in claim 27 wherein said steps (c)(1) and (c)(2) are performed simultaneously with said steps (c)(3) and (c)(4).

32. The method defined in claim 19 wherein said step (a) is performed by providing a mounting projection that extends inwardly from the opening of the first component.

33. The method defined in claim 19 wherein said step (a) is performed by providing a mounting projection that extends outwardly from the opening of the first component.

34. The method defined in claim 19 wherein said step (c) is performed by causing a first portion of the second component to expand outwardly into engagement with a first portion of the first component at such a velocity as to become welded thereto, and by causing a second portion of the second component to expand outwardly into engagement with a second portion of the first component at such a velocity as to become mechanically interlocked therewith.

* * * * *